Jan. 12, 1960  E. O. BENNETT  2,920,509
DRILL BUSHING AND JIG
Filed April 25, 1955

E. O. BENNETT
INVENTOR.

BY S. Tierney Jr.
ATTORNEY

United States Patent Office 2,920,509
Patented Jan. 12, 1960

2,920,509

DRILL BUSHING AND JIG

Elmer Overton Bennett, San Ysidro, Calif., assignor to Rohr Aircraft Corporation, Chula Vista, a corporation of California Application April 25, 1955, Serial No. 503,663

4 Claims. (Cl. 77—62)

This invention relates to a jig for guiding a drill into predetermined positions on a workpiece to bore one or more holes therein and to a novel form of drill bushing and method for attaching same to a template.

The usual type of small drill jig has a hard sleeve whose inner peripheral wall guides the drill into a predetermined position on the workpiece, the sleeve being secured to a holder which in turn is attached to a template adapted to be placed on and secured to the workpiece. The holder is attached to the template by means of two rivets so that it is necessary to drill three holes through the template, two to receive the rivets and one located between the rivet holes to pass the drill.

Holders of the type described are substantially larger than the sleeve so that it is not possible to secure two drill guiding sleeves to a template close together.

It is an object of my invention to provide a drill bushing and jig which overcomes the aforementioned disadvantages and wherein only one hole need be made through the template for each drill bushing.

A further object is to provide for the locating of the drill-guiding sleeve at the desired position on the template by providing a conical locating face on the template and a frusto-conical head on the lower end of the sleeve adapted to seat against the conical locating face.

Another object is to provide for the holding of the sleeve in position by means of a collar which embraces the portion of the sleeve above the template and which is preferably not much larger than the outside diameter of the sleeve.

A further object is to provide for the locking of such collar to the drill-guiding sleeve by making the collar of material which may be easily distorted by the application of an inward pressure which causes portion of the collar to be displaced into one or more recesses provided in the sleeve.

Further objects will become apparent as the description of the drill jig proceeds. For a better understanding of the invention reference is made to the accompanying drawing, in which.

Figure 1:
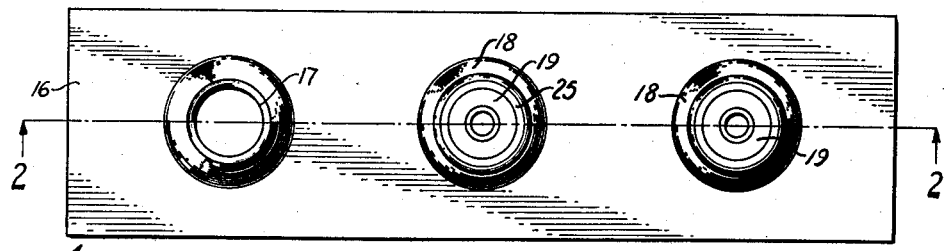
Fig. 1 is a top view of a drill jig embodying the invention.
Figure 2:
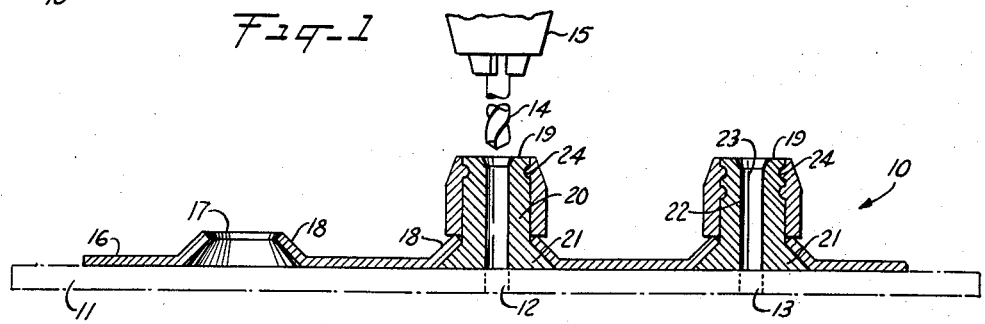
Fig. 2 is a sectional view of the jig taken on line 2—2 of Fig. 1 also showing a drill and chuck.

Referring to Figs. 1 and 2, a drill jig 10 is shown on a workpiece 11 (shown in phantom lines) through which holes 12, 13 are to be drilled by a drill 14 held in a rotating chuck 15. The jig comprises a flat template 16 made of thin sheet steel in which holes of a diameter about .098" are drilled with a No. 40 drill at the center lines of holes 12, 13. These holes are then enlarged to provide holes 17 by a punch which has a pilot pin in its lower end, the pin entering the small holes of .098" diameter and guiding the punch so that the punched holes 17 are concentric with the original drilled holes. The metal around holes 17 is then dimpled in a known manner by a dimpling punch (not shown) to provide frusto-conical shaped projections 18 which serve to locate the drill guiding sleeves 19. Each sleeve 19 is made of steel which may be hardened after machining and has a generally cylindrical body 20 which terminates at its lower end in a frusto-conical shaped head 21 which is concentric with the cylindrical wall 22 of the hole 23 in the sleeve. Hole 23 is preferably flared out slightly at the top to receive and guide the drill as the latter is lowered into cutting position although such flaring is not necessary to practice the invention. One or more circular grooves 24 is cut in body 20 near the top thereof. After machining the sleeves as described, they are heat treated to harden them and each sleeve is attached to template 16 by passing the sleeve up through a hole 17 until its head 21 is seated against the projection 18.

To secure the sleeve in this position, a collar 25 is slid down over body 20, the collar being made of a material such as aluminum alloy, copper or other metal which is much softer than steel and may be easily cut or broken. The major portion of collar 25 has a cylindrical outer wall 26 which connects with a conical wall 27 located opposite the groove 24. A die 28 is provided to compress the top portion of collar 25 and force some of the metal thereof into groove or grooves 24, thereby locking the collar to sleeve 19 and holding the latter in the desired position on template 16. Die 28 preferably has a cylindrical periphery and an opening 29 through its center, the lower section of the opening having a conical wall 30 whose diameter at the lower end is slightly greater than the diameter of face 26 of collar 25. The diameter of the upper end of wall 30 is slightly less than that of face 26 and above this the wall has a conical face 31 of greater taper to abut face 27 and press it inwardly. Downward pressure may be applied to the top of die 28 by a rivet squeezer, the blow of a hammer or other pressure source (not shown).

Figs. 1 and 2 show two drill bushings in place and a third projection 18 formed on template 16 ready to receive a third bushing. It will be obvious that the cylindrical walls 22 are normal to the plane through the bottom face of template 16 and will guide the drill 14 as it is lowered to cut the holes 12, 13 at the proper places in workpiece 11.

After the drill-guiding faces 22 have become worn and enlarged by repeated use, any drill bushing may be easily and quickly replaced by resting its collar 25 on an anvil, holding the edge of a chisel against the collar and striking the chisel with a hammer to break it open. Or a saw cut may be made through the collar and the collar removed after which the sleeve 19 may be removed and a new one inserted and secured in place by a new collar. The diameter of hole 23 is selected according to the size of the drill to be used and the invention has been found suitable for drills from .098" to .250" diameter, the size of sleeve 19 and collar 25 being increased for the larger drill sizes.

Figure 7:
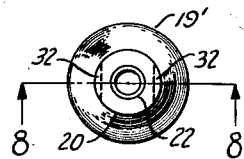
Fig. 7 is a top view showing a modified form of drill-guiding sleeve.
Figure 3:
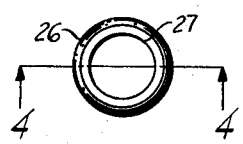
Fig. 3 is a top view of a retaining collar forming part of a drill bushing before pressure has been applied to distort it.
Figure 6:
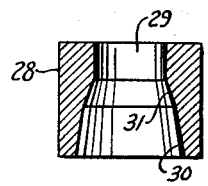
Fig. 6 is a sectional view of the die taken on line 6—6 of Fig. 5.
Figure 8:
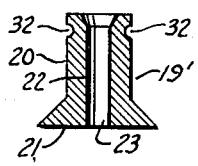
Fig. 8 is a sectional view of the sleeve of Fig. 7 taken on line 8—8.
Figure 4:
Fig. 4 is a sectional view of the collar taken on line 4—4 of Fig. 3.
Figure 5:
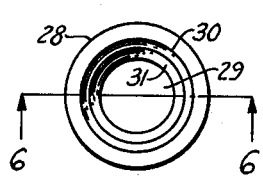
Fig. 5 is a bottom view of a die used to set the retaining collar.

Referring to Figs. 7 and 8, the sleeve 19' is similar to sleeve 19 except that the annular groove 24 is replaced by two straight grooves 32 which may be cut by a milling machine cutter. When the collar 25 is put in place and compressed, a portion of it is displaced into grooves 32, thus anchoring the sleeve fast to template 16.

Figure 9:
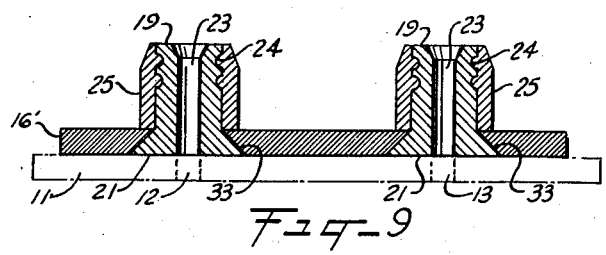
Fig. 9 is a sectional view of a drill jig showing a further modification of the invention.

When it is desirable to use thicker stock for template 16', as shown in Fig. 9, the projections 18 are omitted and small holes of about .098" diameter are first drilled through the template at the proper distance apart. These holes are then countersunk to provide conical walls 33 against which the frusto-conical heads 21 of sleeves 19 are seated, the sleeves being anchored to the template in the manner above described by collars 25.

It is clear that with my construction only one hole need be made through the template for each drill bushing and that several bushings may be placed close together. For example, in the modification shown in Fig. 9, holes may be drilled in the workpiece whose centers are spaced apart a distance as small as the outside diameter of die 28.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. A drill jig comprising a template composed of a thin sheet of rigid material having a plurality of spaced apart circular apertures therein, the portions of the sheet around said apertures being bent up to provide frusto-conical sleeve locating walls, hard metal sleeves terminating at their lower ends in frusto-conical heads seated against said sleeve locating walls, the upper ends of said sleeves having peripheral guide surfaces of circular cross section and each of said sleeves having a long cylindrical drill guiding wall concentric with its frusto-conical head; and retaining collars composed of material softer than said sleeves, in contact with said guide surfaces, said collars and sleeves having mutually interlocking portions which retain the lower ends of the collars in contact with said bent-up portions of the sheet and thereby lock said sleeves to the sheet.

2. A drill jig as claimed in claim 1, in which the lower end of each of said conical heads is substantially flush with the lower face of the abutting portion of the template.

3. A drill guide bushing constructed for attachment to a single thin rigid plate constituting a template, said plate having a vertical opening therethrough with a marginal conical wall which converges upwardly, for the construction of a drill jig, comprising: a sleeve whose inner peripheral wall is adapted to guide the rotating drill as the drill is lowered through the sleeve, said sleeve being composed of hard material and having at its lower end a conical peripheral face concentric with said inner peripheral wall, said conical face being constructed to seat against said conical wall when the lower end face of the sleeve is substantially flush with the bottom face of said plate to thereby accurately position the bushing on the template, said sleeve having a length substantially greater than the thickness of said template and the upper portion of the sleeve having a peripheral wall with one or more grooves therein; and a collar composed of material softer than that of said sleeve, said collar being positioned over said sleeve with the lower end of the collar engaging the template and the inner wall of the collar in contact with the peripheral wall of said sleeve, a portion of said collar being displaced into said groove to anchor the bushing to said template.

4. A drill guide bushing constructed for attachment to a single thin rigid plate constituting a template, said plate having a vertical opening therethrough with a conical wall which converges upwardly, for the construction of a drill jig, comprising: a steel sleeve whose inner peripheral wall is adapted to guide the rotating drill as the drill is lowered through the sleeve, said sleeve terminating at its lower end in a frusto-conical head concentric with said inner peripheral wall, said head being constructed to seat against said conical wall when the lower end face of said head is substantially flush with the bottom face of said plate to thereby accurately position said bushing on said template, the upper portion of said sleeve having a guide surface of circular cross section whose diameter is substantially equal to that of the upper end of said head, said guide surface having at least one recess therein; and a collar composed of metal softer than said sleeve, the inner wall of said collar engaging said guide surface and the bottom of the collar resting on the template, a portion of said collar being displaced into said recess to anchor the bushing to said template.

References Cited in the file of this patent

UNITED STATES PATENTS

| | | |
|---|---|---|
| 1,237,143 | Allen | Aug. 14, 1917 |
| 1,412,087 | Ottinger | Apr. 11, 1922 |
| 2,542,376 | Torresen | Feb. 20, 1951 |
| 2,632,942 | Berg et al. | Mar. 31, 1953 |